United States Patent
Spawr

(10) Patent No.: US 7,420,146 B1
(45) Date of Patent: Sep. 2, 2008

(54) LASER BEAM MONITOR AND CONTROL METHOD

(76) Inventor: Walter J. Spawr, 2051 Spawr Cir., Lake Havasu City, AZ (US) 86403-1980

( * ) Notice: Subject to any disclaimer, the term of this patent is extended or adjusted under 35 U.S.C. 154(b) by 118 days.

(21) Appl. No.: 11/075,594

(22) Filed: Mar. 8, 2005

(51) Int. Cl.
*H01S 3/13* (2006.01)
*G01J 1/32* (2006.01)

(52) U.S. Cl. ............ 250/205; 372/29.01; 356/338
(58) Field of Classification Search ........... 372/29.01, 372/29.02, 29.014, 29.021; 250/205; 356/336–341, 356/445–446, 947
See application file for complete search history.

(56) References Cited

U.S. PATENT DOCUMENTS

| | | | |
|---|---|---|---|
| 4,745,280 A | 5/1988 | Gi et al. | |
| 4,764,655 A | 8/1988 | Ortiz, Jr. et al. | |
| 4,792,690 A | 12/1988 | McCann et al. | |
| 4,842,404 A | 6/1989 | Duda | |
| 4,947,047 A * | 8/1990 | Muraki | 250/492.2 |
| 5,523,837 A | 6/1996 | Prozzo | |
| 6,396,062 B1 | 5/2002 | Buck et al. | |
| 6,516,013 B1 * | 2/2003 | Patzel et al. | 372/29.02 |
| 2002/0071459 A1 * | 6/2002 | Malone et al. | 372/29.02 |
| 2002/0141463 A1 * | 10/2002 | Brunn-Larsen et al. | 372/29.021 |

FOREIGN PATENT DOCUMENTS

JP 03126281 A * 5/1991

* cited by examiner

*Primary Examiner*—Kevin Pyo

(57) ABSTRACT

A device and method for monitoring a light beam (e.g., laser beam) without intruding upon the light beam is disclosed. The device comprises a focusing lens which receives scattered light from a reflective or transmitting optical element and directs the scattered light to a photo detector. The photo detector generates one or more electrical signals which are proportional to an intensity distribution of the light beam for analysis by a processor. The analyzed electrical signals are then used to adjust a light beam source accordingly. The device may further comprise a display and printer for visually depicting the light beam characteristics.

15 Claims, 7 Drawing Sheets

4 KW Donut Mode – 2-D View at 45°

4 KW Donut Mode – 3-D View at 45°

LASER BEAM MONITOR AND CONTROL METHOD

FIELD OF INVENTION

The embodiments of the present invention relate to a non-intrusive device and method to subjectively and quantifiably measure and monitor the characteristics and parameters of a laser beam or beam of light wherein the parameters include the radiant energy power in the beam and/or the spatial energy power intensity distribution, which is typically referred to as the beam profile or beam intensity profile. The device and method may also incorporate a self-adjusting feature to automatically increase or decrease beam energy power and/or change or modify the beam intensity profile through closed loop electronic means.

BACKGROUND

Devices that monitor or measure energy, power or the spatial intensity profile of a light beam, such as a laser beam, have in the past been intrusive such that they intrude upon, and interrupt, the beam path in some fashion thereby extracting a portion of the energy power from the beam. In many cases the entire beam must be directed into a beam energy power meter or spatial energy intensity profile camera.

In high volume production manufacturing facilities using high power laser beams for materials processing applications, including laser welding, laser cutting, laser heat treating and laser free forming, laser power is routinely and continuously monitored. However, by intrusively dissecting a main primary laser beam and directing the dissected portion into a power meter, the routine and continuous monitoring results in a portion of the usable laser power being sacrificed. In these facilities the beam spatial intensity profile is only monitored or checked infrequently, and not on a continuous basis, because this procedure requires a costly interruption or stoppage of production of the company's products.

Because the quality of laser processed products is highly dependent on laser beam power and precise beam profile control it is desirable to non-intrusively and continuously monitor laser beam parameters while maintaining an ability to immediately make changes or compensations when the parameters unacceptably fluctuate or change over time. The embodiments of the present invention solve the aforementioned problems by non-intrusively monitoring only the unused small portion of scattered light or laser light that is conventionally lost off the surface of an optical lens or mirror that is typically required to reside in the beam path to accomplish the intended laser process application.

As described below, the patent literature includes numerous examples of light monitoring devices.

U.S. Pat. No. 4,842,404 discloses a system for monitoring the energy power in a light beam resulting in the least amount of intrusion into the light beam as possible. However, even with the system disclosed, a "beam splitter" optic is placed into the primary beam path to reflect a substantial portion of the beam into an orthogonal axis for directing it into an energy power meter while a majority of the primary beam is allowed to pass through.

U.S. Pat. No. 5,523,837 describes an "essentially non-intrusive laser power meter." However, the invention utilizes a "beam splitter" that is intrusively placed into the beam path splitting off 1% to 5% of the beam which is then directed into a silicon photodiode power meter.

U.S. Pat. No. 4,792,690 discloses a laser beam monitoring device utilizing a transmitting crystal optic intrusively placed into the beam path that produces a color pattern that corresponds to the laser beam intensity distribution profile. U.S. Pat. No. 6,396,062 discloses a laser beam monitor that requires placement of a fluorescent screen into the primary laser beam path such that the screen is monitored by a camera wherein the images captured by the camera may then be displayed on a computer screen.

U.S. Pat. No. 4,745,280 discloses a laser beam profiling apparatus that requires intrusive attenuation of the beam accompanied by a device that scans the attenuated beam across a photo sensor which produces an electric signal proportional to the beam intensity so as to permit adjustment of the oscillation mode of the laser beam to achieve an efficient beam. U.S. Pat. No. 4,764,655 discloses a device to monitor the size of the focused laser beam and to perform a closed loop adjustment through a robot when necessary.

Each of the above-described devices is intended to monitor or measure the power level or beam mode quality of the light beam but each device is intrusive. A possible exception is an expensive custom made diffraction grating mirror, but such mirrors typically extract noticeably usable and excessive quantities of power from the primary beam. The embodiments of the present invention comprise non-intrusive devices which do not extract more energy power from the primary beam than would typically be lost to scatter.

SUMMARY

A first embodiment of the present invention comprises a light beam energy power measurement device including a focusing lens or mirror that collects and directs stray or scattered light from a primary light source to a photon detector, photodiode, photocell, photovoltaic detector device or any other device that converts or senses photon radiation and produces a proportional output electrical signal.

The produced proportional output electrical signal generates a quantitative display of relative radiant energy power associated with the light beam. This electrical signal may also be used as a benchmark reference to determine if the power level of the beam is remaining constant and, through a closed loop electronic circuit, may automatically drive a device that ramps up or ramps down the light or laser beam power source as required.

In a second embodiment of the present invention, the stray or scattered light is focused and directed to and passes through a pin-hole spatial filter and is then collected by a second lens which focuses and directs the light to one or more photo detector elements, such as a focal plane array, digital camera, or CCD camera, where said individual detector elements are also referred to as pixels. Each pixel produces an electrical signal proportionate to the power or energy in the radiant light source that strikes it. The light source is spread over many pixels, therefore, spatial intensity variations or spatial non-uniformities in the light intensity per unit area striking the array of pixels produces different but proportionate voltages from each pixel. The voltages generate a processed signal which is analyzed by a computer processor and displayed in a two or three dimensional intensity format. The processed signal may also be used in a closed loop fashion to automatically adjust the laser or light source for compensation of spatial intensity uniformity anomalies.

Other features, variations and embodiments will become evident from the detailed description, drawings and claims set forth below.

DESCRIPTION

Figure 1:
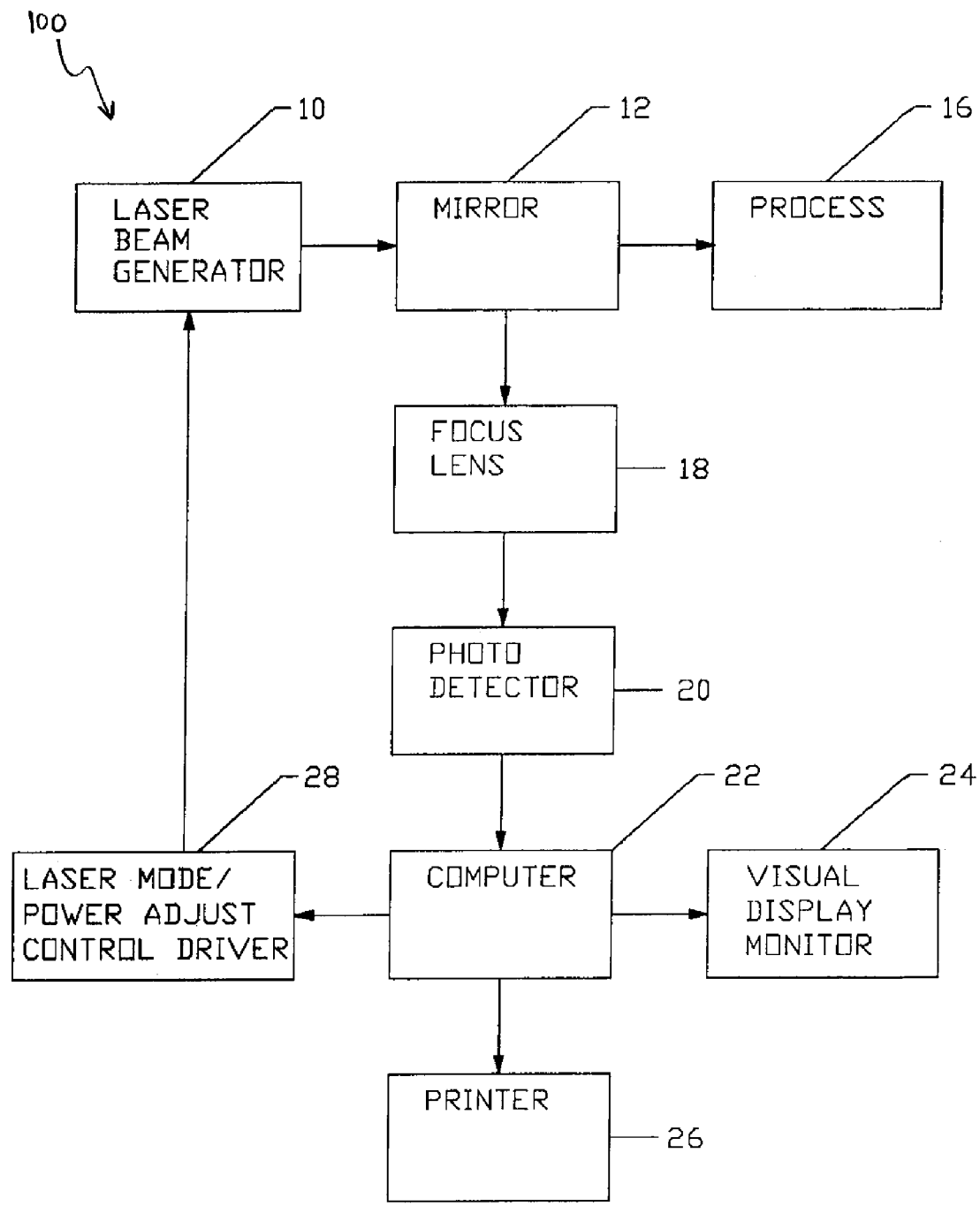
FIG. 1 illustrates a block diagram representation of optical and electrical relationships.

Reference is now made to the figures wherein like parts are referred to by like numerals throughout. FIG. 1 shows a block diagram of a first embodiment of a laser beam monitor generally referred to by reference numeral 100. A laser beam is generated by laser source 10. In a typical processing application, the laser beam is directed toward a beam bending mirror 12 that directs the beam toward a final position where the laser beam interacts with a certain material. At a process station 16 the beam may heat up or melt the material during a heat treating, welding or similar application. Because no mirror is absolutely perfect, a small portion of the generated light beam is scattered off the surface of the mirror 12 and captured by a focusing lens 18 and then directed and focused onto a photo detector 20 where the photon light energy is converted to an electrical signal sent to a computer 22. The computer 22 processes the electric signal and produces a visual image on monitor 24. The computer 22 can also send a signal to a printer 26 which generates hard copies of the data.

When the laser monitoring device is used in a closed loop fashion, a signal is automatically sent to a laser mode or power adjust control driver device 28 that ramps the power level of the laser source 10 or modifies the spatial intensity distribution profile of the laser beam by driving the adjust mechanisms of the laser source 10.

Figure 2:
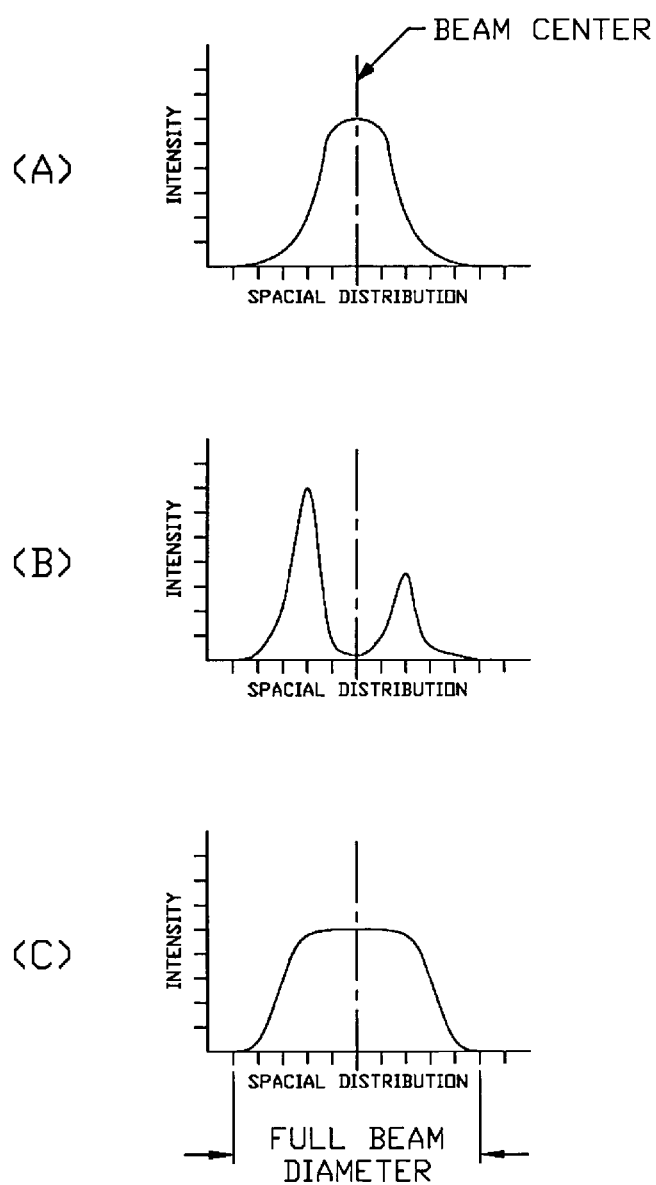
FIGS. 2(A)-2(C) illustrate typical two-dimensional spatial intensity profiles for various laser beams.

FIGS. 2(A)-2(C) illustrate cross-sectional examples of three different spatial intensity profiles found with typical laser beams.

Figure 3:
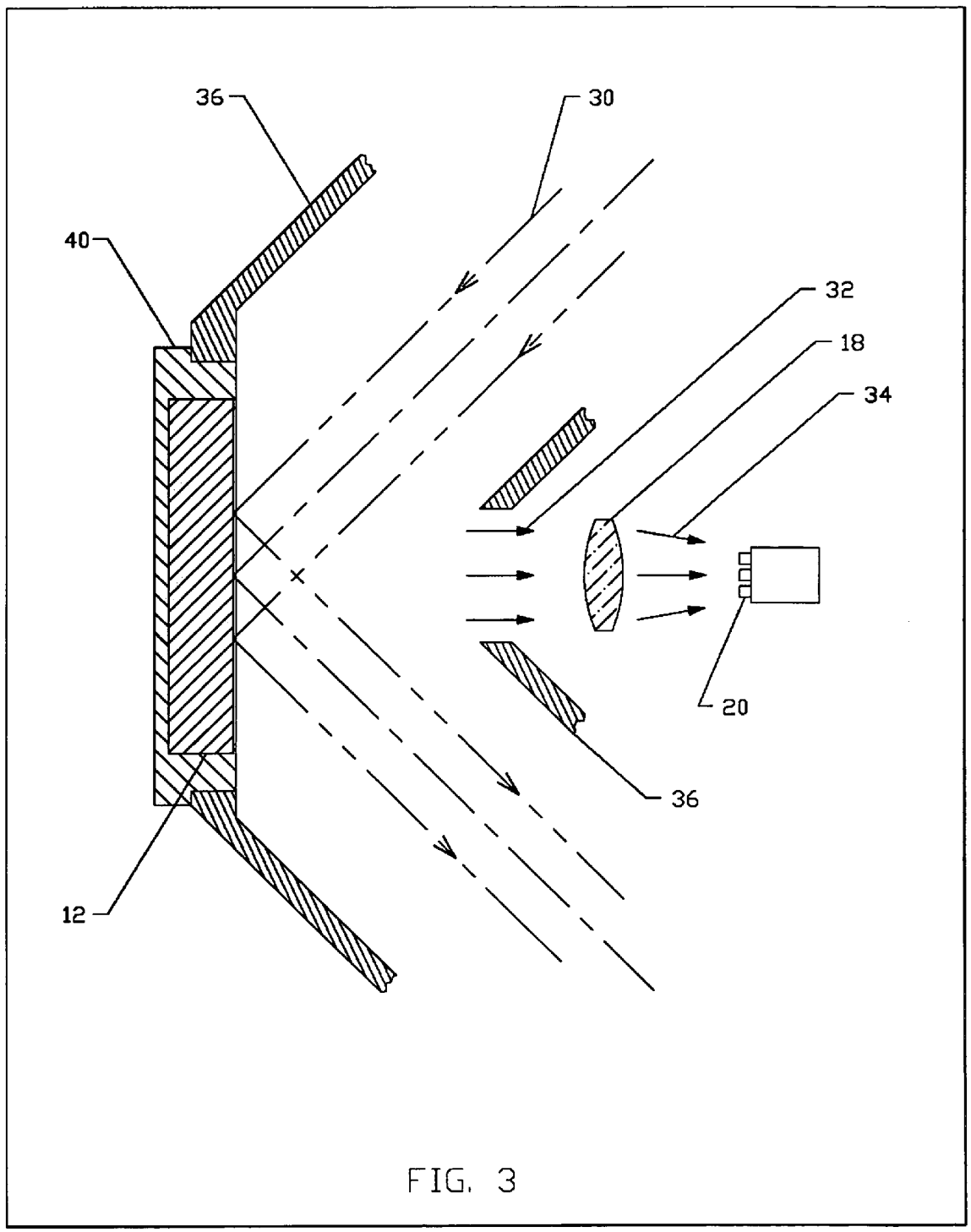
FIG. 3 illustrates a photon optical and hardware arrangement along with a primary laser light beam as it propagates to and from a mirror.

FIG. 3 more specifically illustrates the light beam path of a typical primary laser beam 30 as it strikes the 90 degree bending mirror 12 and the small portion of stray light 32 is scattered off mirror 12, captured by the lens 18, and the rays 34 are focused and directed toward the photo detector 20. The mirror 12 is housed by the beam transport tube 36, which provides a wall enclosing the beam 30, and a mirror capture cover plate 40. The beam transport tube 36 surrounds the scattered light 32, 34.

Historically, all optical surfaces possess some degree of roughness or imperfection due to limitations of the manufacturing processes. In some cases, the roughness or imperfections may be at the atomic or molecular level but most often it is in the form of scratches and gouges having width and depth measurements in the range of angstroms to microns. The surface defects can be randomly or regularly located depending on the manufacturing process. The surface defects produce light scattering as a light beam strikes the surface.

Figure 4:
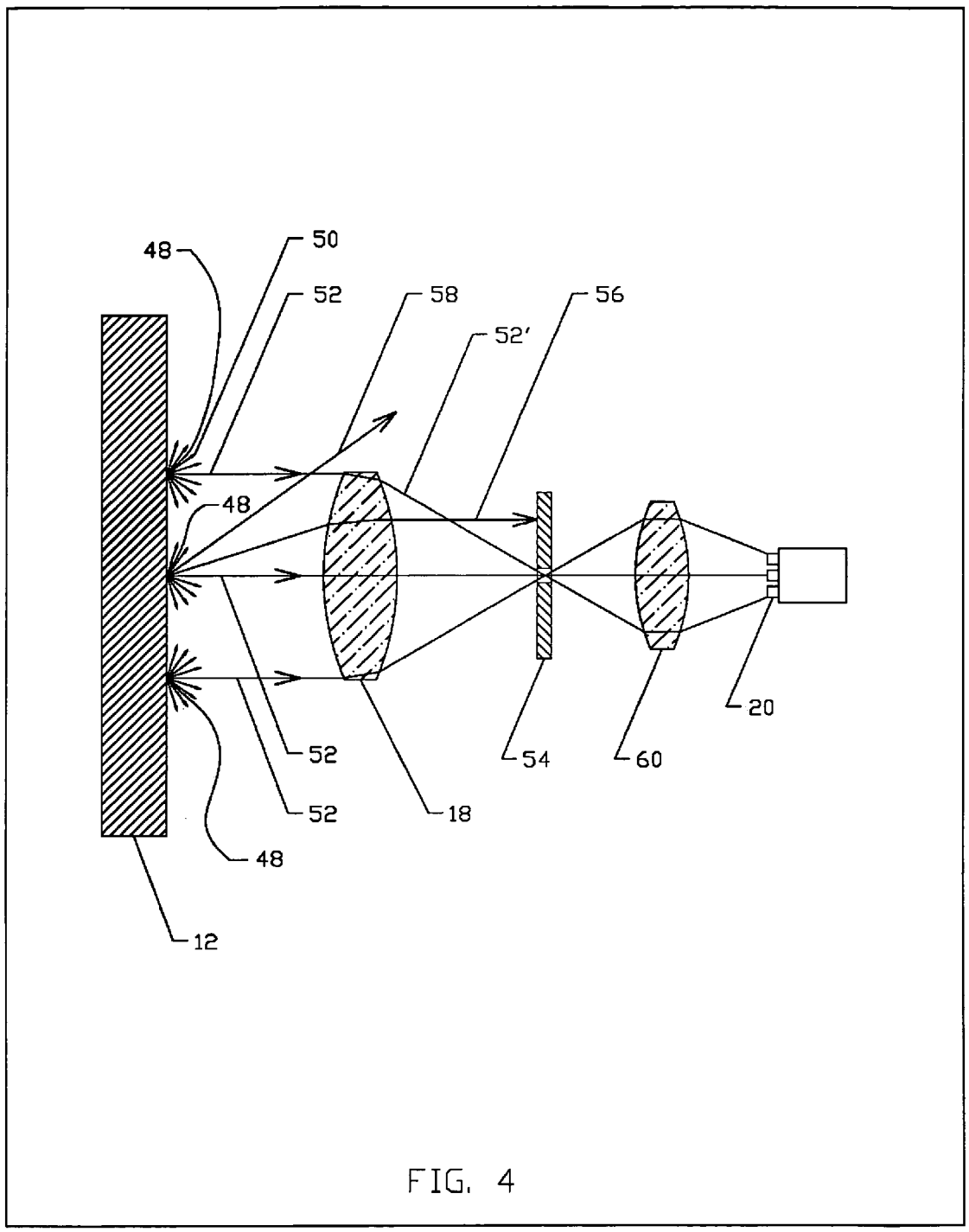
FIG. 4 illustrates stray scattered light propagating to a focusing lens and a photo detector.

Now referring to FIG. 4, with long established conventional manufacturing processes, the defects are uniform in size and shape, and uniformly dispersed and located on the optical surface, such that a small portion of the bulk of the scattered light is directionally scattered and propagates in a uniform pattern that is linearly proportional to the intensity distribution or mode pattern of the primary optical beam striking the mirror. The spatial intensity distribution striking lens 18 tracks the spatial intensity distribution of the primary beam 30. Therefore, a custom made mirror, such as a diffraction grating, is no longer required.

FIG. 4 is intended to clearly illustrate the above-reference scattering phenomenon as it applies to the embodiments of the present invention. When mirror 12 is exposed to a light, a portion of the light is scattered off by surface defects. For clarity, three identical scattering defect sources 48 are illustrated in FIG. 4. The light photons can scatter in all directions in a hemispherical envelope 50 but a few of the light photons 52 scatter off and remain relatively parallel to each other for some distance. This group or envelope of parallel rays 52 are collected and focused by lens 18. Rays 52' converge at a focus point of the lens 18 and pass through a small hole known as a pin-hole spatial filter 54. The spatial filter 54 blocks all extraneous and non-parallel rays 56 while other rays 58 completely pass by the lens 18. The rays 52' that pass through the spatial filter 54 are relatively free of scattered extraneous non-contributing rays 56, 58 which are considered background noise herein. The rays 52' passing through filter 54 are then imaged onto photo detector 20 by a second lens 60. Photo detector 20 converts the photon energy into an electrical signal that is proportional to the radiant power energy in the primary beam when a single detector element is used and the spatial intensity profile of the primary beam of light when a photonic detector array is used.

Figure 5:
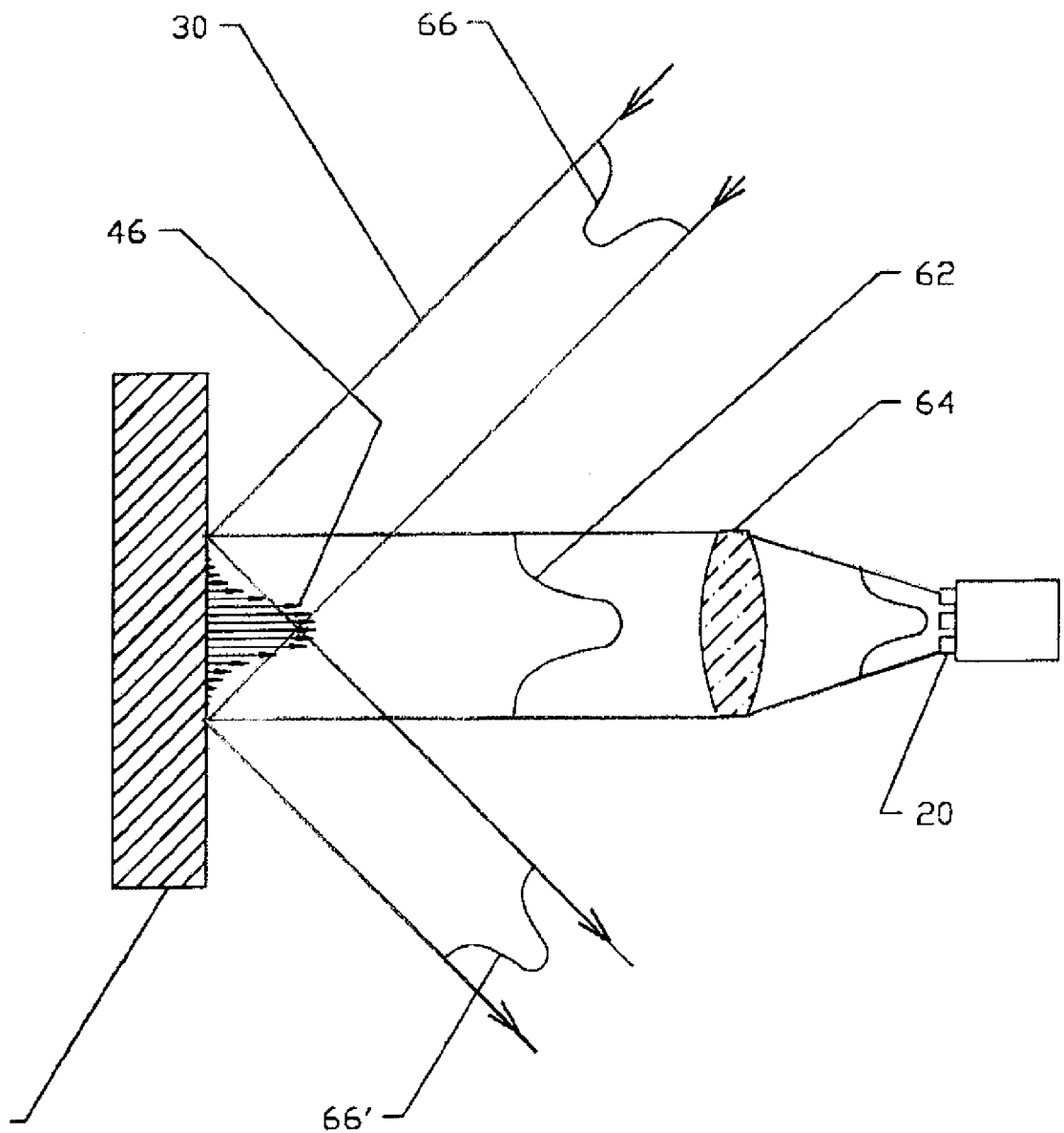
FIG. 5 illustrates the relationship between the primary laser beam and the stray scattering light profile propagation to and through the focusing lens.

FIG. 5 further illustrates the relationship between the primary beam 30 and the parallel scattering rays 46 and the projected spatial profile 62 which moves through lens 64 to the detector 20. In this configuration, a spatial filter is not used since lens 64 has a very short focal length. More specifically, the spatial filter is not necessary because extraneous non-parallel rays suffer from spherical aberration caused by lens 64 and said rays do not focus well and, therefore, fall outside the imaging envelop of the detector 20. Thus, said extraneous rays do not substantially contribute to background noise at the true image plane on the detector 20. Accordingly, resolution of the spatial intensity profile remains high. The primary laser beam 30 has a Gaussian profile 66 and 66' (also see FIG. 2(A)). The Gaussian profile 66 is illustrated striking a surface of mirror 12 causing scattering 46 to take place. In conventional practice, scattering randomly changes the spatial distribution of the beam 30. However, the spatial distribution does not change within a very small envelope considering that only a small portion of photons scatter off in non-random angle patterns but remain parallel to several adjacent photons where the several adjacent photons are sufficient in number to represent the profile 62 of the original primary beam 30.

Figure 6:
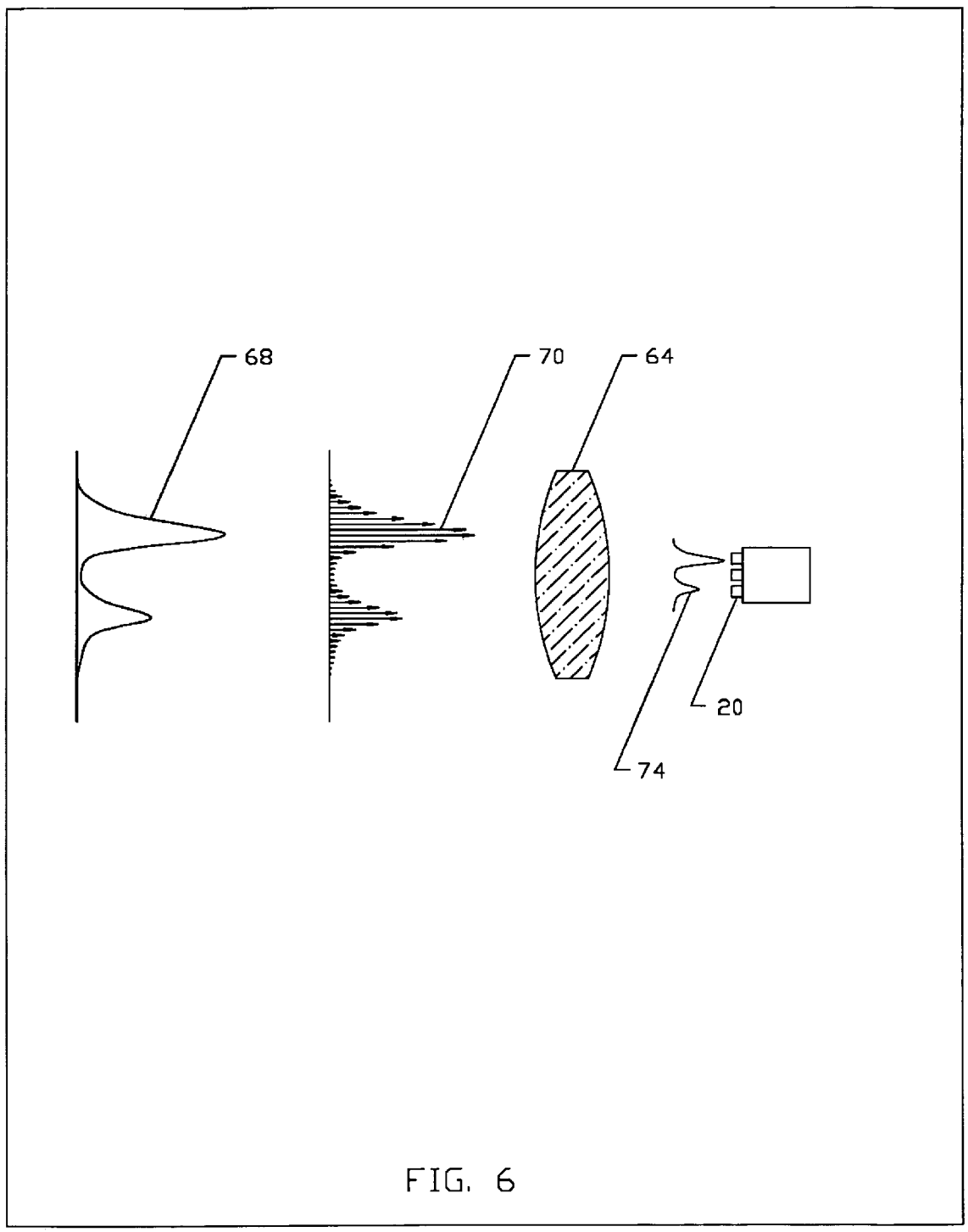
FIG. 6 illustrates a donut-mode scattered light beam profile propagation to the photo detector.
Figure 7A:
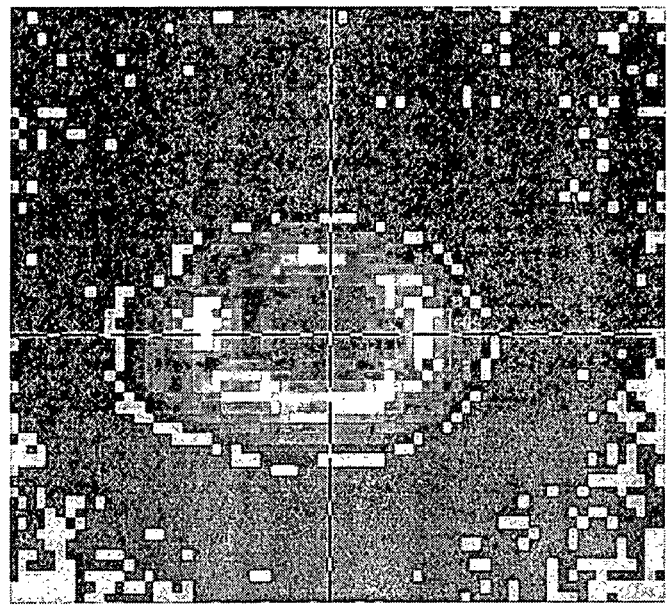
FIGS. 7A and 7B illustrate a two-dimensional (A) and three-dimensional (B) image produced by the embodiments of the present invention.
Figure 7B:
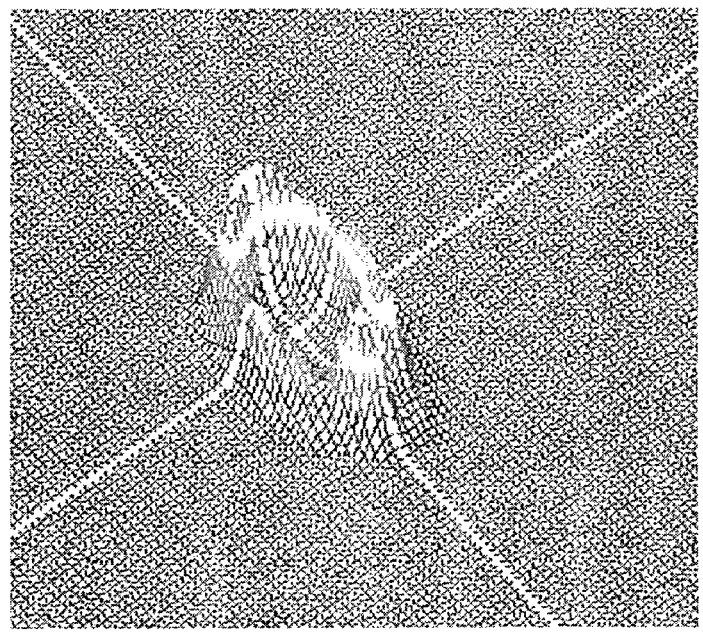

This is further illustrated in FIG. 6 where the cross section of a donut mode laser 68 (also see FIG. 2(B)) and scattering profile 70 is shown with a high intensity outer shell and low intensity central section as it propagates toward the lens 64. The only photons that preserve the original profile 70 are those that remain relatively parallel and therefore pass through the lens 64 and form the donut mode profile 74 on detector 20. FIGS. 7A and 7B illustrate two actual images produced by the embodiments of the present invention. FIG. 7A is a two dimensional image of the spatial intensity distribution (see FIGS. 2B and 6) of a 4,000 watt CO2 laser beam. FIG. 7(B) is a three dimensional image of the same beam.

Although the invention has been described in detail with reference to several embodiments, additional variations and modifications exist within the scope and spirit of the invention as described and defined in the following claims.

I claim:

1. A non-intrusive method for monitoring spatial light intensity distribution of a beam of light comprising:
    collecting scattered light from a light beam reflected off of an in-situ reflecting optical element; and analyzing the collected scattered light to determine the spatial light intensity distribution of the beam of light.
2. The method of claim 1 wherein the light beam is a laser beam.
3. The method of claim 1 wherein said optical element is a mirror.
4. The method of claim 1 wherein said optical element is one surface of a mirror, lens, optical window or transmitting beam splitter.
5. The method of claim 1 wherein collecting and analyzing the scattered light does not remove any significant energy from the beam of light.
6. The method of claim 1 further comprising directing scattered light to one or more optical detectors which convert the light into one or more electrical signals, said electrical signals being proportional to an amount of light energy collected.
7. The method of claim 6 further comprising processing the one or more electrical signals through a conditioning electronic circuit and then numerically or graphically displaying the one or more electrical signals for visually depicting the amount of light power or energy collected.
8. The method of claim 1 further comprising directing scattered light through an optical spatial pin-hole filter and then collecting and refocusing said scattered light using a second transmitting optical element and then imaging said refocused light onto one or more optical detectors.
9. The method of claim 8 wherein the one or more optical detectors comprise a focal plane array, CCD camera or digital camera.
10. The method of claim 9 wherein said one or more optical detectors incorporate pixels wherein each pixel produces an electrical signal that is proportional to the intensity of light striking it such that the electrical signals generate a visible numeric or graphical display in two or three dimensions which quantifiably represents a spatial light intensity distribution in the light beam.
11. The method of claim 10 further comprising measuring and monitoring absolute radiant energy in the light beam.
12. The method of claim 11 further comprising automatically increasing or decreasing the absolute radiant energy in the light beam in response to a fault condition being detected.
13. The method of claim 12 further comprising establishing a reference benchmark standard beam profile for the spatial light intensity distribution and automatically sending an electrical signal when necessary to readjust a light beam source for maintaining conditions established in the reference benchmark beam profile.
14. The method of claim 1 further comprising utilizing computer processing means for storing, analyzing and retrieving said data in numeric and/or graphic form.
15. The method according to claim 14 wherein the data in numeric and/or graphic form is displayed in two or three dimensions which correspond to a light beam intensity distribution showing a spatial intensity profile of the light beam.

* * * * *